United States Patent [19]

Taga et al.

[11] Patent Number: 4,507,547

[45] Date of Patent: Mar. 26, 1985

[54] HEAT WAVE SHIELDING LAMINATION

[75] Inventors: Yasunori Taga; Yutaka Sawada, both of Aichi, Japan

[73] Assignee: Kabushiki Kaisha Toyota Chuo Kenkyusho, Aichi, Japan

[21] Appl. No.: 498,091

[22] Filed: May 25, 1983

[30] Foreign Application Priority Data

Jun. 1, 1982 [JP] Japan ................... 57-93873

[51] Int. Cl.³ .............................. H05B 3/16
[52] U.S. Cl. .................... 219/543; 219/354; 219/522; 350/1.6; 350/164
[58] Field of Search ............... 219/203, 218, 219, 354, 219/522, 543; 350/1.6, 1.7, 164, 165

[56] References Cited

U.S. PATENT DOCUMENTS

| | | | |
|---|---|---|---|
| 3,279,317 | 10/1966 | Ploke | 350/1.6 |
| 3,331,941 | 7/1967 | Edwards et al. | 219/354 |
| 3,427,089 | 2/1969 | Webb | 350/1.6 |
| 3,468,594 | 9/1969 | Vogl et al. | 350/1.6 |
| 3,514,174 | 5/1970 | Gans et al. | 350/1.6 |
| 3,591,248 | 7/1971 | Meunier et al. | 350/1.6 |
| 3,630,809 | 12/1971 | Edwards | 350/1.6 X |
| 4,127,789 | 11/1978 | Köstlin et al. | 350/1.6 X |
| 4,229,066 | 10/1980 | Rancourt et al. | 350/1.6 |
| 4,352,006 | 9/1982 | Zega | 219/219 |
| 4,382,177 | 5/1983 | Heanly | 219/522 |

Primary Examiner—Volodymyr Y. Mayewsky
Attorney, Agent, or Firm—Koda and Androlia

[57] ABSTRACT

A heat wave shielding lamination consisting of two types of infrared shield layers having different optical characteristics laminated alternately one on top of another is provided on the surface of a glass substrate to realize shielding against heat waves, particularly infrared rays near the visible light range, without impairing transmittance to visible light. Both types of infrared shield layers have approximately the same refractive indexes in the visible light range but have different refractive indexes in the heat wave spectrum against which shielding is desired. The thickness of one type of infrared shield layer is made to equal $\lambda/4n_A$ (where $\lambda$ stands for the wavelength at the center of said heat wave spectrum and $n_A$ stands for the refractive index at the wavelength $\lambda$) and the thickness of the other type of infrared shield layer is made equal to $\lambda/4n_B$ (where $\lambda$ stands for the wavelength at the center of said heat wave spectrum and $n_B$ stands for the refractive index at the wavelength $\lambda$). The heat wave shielding therefore has good transmittance to visible light and good shielding effect against heat waves by virtue of the fact that at least one type of said layers exhibits shielding effect against long-wavelength rays in the infrared spectrum by absorbing and/or reflecting such rays and the fact that the two types of infrared shield layers together exhibit shielding effect against infrared rays in the near-infrared spectrum by interferential reflection of such rays.

10 Claims, 11 Drawing Figures

HEAT WAVE SHIELDING LAMINATION

BACKGROUND OF THE INVENTION

1. Field of the Invention

This invention relates to a heat wave shielding lamination, and more particularly to an improved heat wave shielding lamination comprising a plurality of thin layers laminated on the surface of a visible light transparent substrate and possessing excellent shielding effect against heat waves, especially against infrared rays near the visible light range, without impairing the transparency to visible light.

2. Description of the Prior Art

Various plate materials such as those formed of glass or plastic demonstrate good transparency to visible light. However, these same materials also have good transparency to infrared rays, i.e. to rays having longer wavelength of the visible light, and because of this, there are many applications in which it becomes necessary to provide some appropriate means for coping with the energy of the heat waves passing through the plate material. An example of this is seen in the case of car windows which disadvantageously allow sunlight passing therethrough to raise the temperature of the interior of the car, thus making it necessary to equip the car with a large-capacity air conditioner. The need for a heat wave shield is by no means limited to the car window and extends widely to such sheet materials as window panes for airplanes and ships, the lenses of spectacles and cameras, glass panes for buildings and refrigerated showcases, and peephole glasses for such equipment as cooking ovens, furnaces and welding masks.

There is known a conventional method of providing such sheet materials with a specific coating in order to prevent the passage of heat waves. One known coating material capable of providing some degree of heat shielding is ITO (Indium-Tin-Oxide, which consist of $In_2O_3$ with added Sn).

Such conventional coatings are, however, inadequate since they do not provide sufficient heat wave shielding effect and, in particular, since they have low shielding rates against near-infrared rays with wavelengths in the vicinity of 10,000 angstroms which are the rays that it is most important to shut out in shielding against the heat waves in sunlight.

SUMMARY OF THE INVENTION

The primary object of the present invention is to provide an improved heat wave shielding lamination wherein the aforesaid infrared ray shielding layer consisting of a coating of ITO or the like is further improved so that effective heat wave shielding can be attained in the near-infrared and infrared spectrums without loss of transmittance in the visible light range.

This object of the present invention is attained by providing a visible light transparent substrate with an overlying composite lamination consisting of at least one first infrared shield layer and at least one second infrared shield layer arranged alternately one on top of the other, said first and second infrared shield layers having approximately the same refractive indexes in the visible light range but having different refractive indexes in the heat wave spectrum against which shielding is desired, said first infrared shield layer having a thickness of about $\lambda/4n_A$ (where $\lambda$ stands for the wavelength at the center of said heat wave spectrum and $n_A$ stands for the refractive index at the wavelength $\lambda$) and said second infrared shield layer having a thickness of about $\lambda/4n_B$ (where $\lambda$ stands for the wavelength at the center of said heat wave spectrum and $\lambda n_B$ stands for the refractive index at the wavelength $\lambda$), whereby the resulting heat wave shielding lamination has good transmittance to visible light and good shielding effect against heat waves by virtue of the fact that at least one of said first and second infrared shield layers exhibits shielding effect against long-wavelength rays in the infrared spectrum by absorbing and/or reflecting such rays and the fact that the two infrared shield layers together exhibit shielding effect against infrared rays in the near-infrared spectrum by interferential reflection of such rays.

Further, in the present invention it is preferable to adjust the amount of additions made to the materials of the first and/or second layer so as to expand the wavelength range over which heat wave absorption is obtained, to heighten the absorptance of the layers for infrared radiation, to adjust the hue presented by the lamination and/or to make the layers electrically conductive. The range over which the additions are adjusted in this case should be 0–40 atomic %, preferably 5–20 atomic %.

Therefore, since in accordance with the present invention the two infrared shield layers have different refractive indexes at the center wavelength of the heat wave spectrum to be rejected, the layers together exhibit an interferential reflection effect. In the case of shielding against sunlight it is preferable to select the center wavelength $\lambda$ within the range of 7,000–13,000 angstroms, most preferably within the range of 8,000–10,000 angstroms. Moreover, in this invention shielding against heat waves is obtained not only through this interferential reflection effect but also through the absorption of rays in the infrared spectrum with wavelengths in the vicinity of the center wavelength $\lambda$ and through Drude reflection of rays on the long wavelength side of said center wavelength.

What characterizes the heat wave shielding lamination according to this invention is that while it provides the excellent heat wave shielding effect described in the foregoing, it is nevertheless able to maintain excellent transparency to visible light in spite of the fact that the shielding lamination is formed of different types of layers, since the refractive indexes of both types are nearly equal in the visible light range.

In this invention, the first and second infrared shield layers provided alternately on the surface of a visible light transparent substrate such as glass are each formed to a thickness of about 1,000–2,000 angstroms by a physical method such as vacuum evaporation, sputtering or ion-plating, by a chemical method such as the liquid dispensing method, the spray-terminal decomposition method or the chemical vapor transport method, or by a combination of two or more of such methods.

In forming the infrared shield layers it is best to select materials which are capable of interferential reflection, heat wave absorption and Drude reflection, the three principles which provide the heat wave shielding effect of the present invention, and which have good transparency in the vsible light range. In this invention, In, Sn and O is the main material used for the first infrared shield layers, and as the material for the second infrared shield layers used in combination therewith, it is preferable to use $In_2O_3$. It should be noted, however, that the material of the first infrared shield layer is, of course, not limited to In, Sn and O and that it is also possible to use other materials which have highly wavelength-dependent refractive indexes and which possess the same refractive index as the second infrared shield layer (e.g. $In_2O_3$) in the visible light range but a different refractive index therefrom in the heat wave spectrum against which shielding is required. Examples of such materials include the aforesaid $In_2O_3$ added with an element which readily becomes an ion with a valence number larger than plus 3 such as Sn, W, Mo, Ti, Zr or Pb or with an element such as F which readily becomes an ion with a valence number of minus 1, as well as any of such materials having oxygen vacancies formed therein. Good results can also be obtained using $SnO_2$ or $SnO_2$ added with an element which readily becomes an ion with a valence number larger than plus 5 such as Sb, P, As, Nb or Ta or with an element such as F which readily becomes an ion with a valence number of minus 1, as well as any of such materials having oxygen vacancies formed therein. Moreover, it is also possible to use an oxide semiconductor containing Cd and Sn such as $Cd_2SnO_4$ or any of a number of transition metal oxides and nitrides.

The interferential reflection which plays an important role in the heat shielding effect of the present invention and which will be explained in detail later is attained by using a plurality of layers of two different types. From theoretical studies and experimentation it is known that for optimum utilization of this interferential reflection it is perferable that the number of layers of the material with the higher refractive index at the wavelength to be interferentially reflected be one greater than the number of layers of the material with the lower refractive index at such frequency. And in this invention best results are obtained when such an arrangement is used. Also, as regards the number of layers to be used, it is known that as the number of layers is increased, there is an increase in the degree of interferential reflection as well as a narrowing of the peak width of the interferentially reflected wavelengths. The number of layers also has an effect on absorption and Drude reflection as well as on the electrical resistivity of the composite layer. Namely, a larger number of layers results in a greater heat wave shielding effect by absorption and Drude reflection and in a smaller resistivity. Therefore, taking these heat wave shielding effects as well as the manufacturing cost and other aspects of production into consideration, optimum overall results are ordinarily attained when the number of layers is 3, 5, 7 or 9, and from a practical point of view, 5 or 7 layers are generally preferable.

By employing a lamination comprised of a plurality of two types of infrared shield layers in accordance with this invention there is realized extremely high heat wave shielding effect while maintaining good transmittance of visible light. These effects will now be explained one by one.

The first shielding effect of the present invention results from interferential reflection, a phenomenon realized by alternately laminating two types of infrared shield layers having different refractive indexes at the wavelength $\lambda$ of the heat wave against which shielding is required.

FIG. 1 shows the dependence of the refractive index on wavelength of In, Sn and O selected as the first infrared shield layer and of $In_2O_3$ selected as the second infrared shield layer. Although with both materials the refractive index decreases with increasing wavelength, it will be noted that the rate of decrease is more pronounced for In, Sn and O than for $In_2O_3$. Thus, at wavelengths in the region where heat wave shielding is required, namely in the infrared spectrum near the visible light range (e.g., at wavelengths between 7,500–12,000 angstroms), the two types of layers have adequately different refractive indexes so that if alternate layers of these materials are formed into a composite lamination the so-obtained multilayer structure will produce interferential reflection. Then by selecting the thickness of the respective layers to be $\lambda/4n$ (where $\lambda$ stands for the wavelength at the center of the heat wave spectrum against which heat wave shielding is required), it is possible to obtain an exceedingly strong interferential reflection. Thus, by selecting the thickness of the layers in accordance with the wavelength of the heat energy to be rejected, it is possible to realize effective interferential reflection within the desired wavelength spectrum. This means that, for example, an automobile window can be made to reject heat waves without impairing its ability to transmit visible light. All that need be done is to use shield layers with thicknesses that shut out wavelengths of about 8,000–10,000 angstroms, the ordinary heat wave spectrum of sunlight.

The conventional single ITO or $In_2O_3$ layer used for shielding against near-infrared rays has ordinarily had transmittance for infrared rays and for this reason has been incapable of providing good heat wave shielding. On the other hand, in the heat wave shielding lamination in accordance with this invention, the two types of layers provide good interferential reflection in the near-infrared spectrum so that there is no rise in the temperature of the composite lamination itself and, consequently, no re-emission of heat therefrom, meaning that the heat wave shielding lamination of this invention is ideally suited for the glass of automobile windows.

As optimum results are obtained when the thickness of the respective layers is set at $\lambda/4n$ with respect to the desired wavelength $\lambda$, this is used as a reference, but it should be understood that in accordance with this invention the actual thicknesses can be varied as desired within the range of 70–140% of this reference value. With this range of variation, it is possible to obtain a heat wave shielding effect suitable for virtually any practical application.

As explained in the foregoing, the interferential reflection produced by the heat wave shielding lamination of this invention provides a good heat wave shielding effect against the near-infrared spectrum while, at the same time, providing this invention with one of its characterizing features, namely that this pronounced interferential reflection does not arise in the visible light range so that good transparency to visible light is maintained unimpaired.

This good transparency in the visible light range results from the fact that the two types of shielding layers have almost identical refractive indexes in the visible light range, as will be noted from the example illustrated in FIG. 1 which shows the indexes to be approximately 2 in the visible light range.

Although there have been earlier attempts to use a plurality of layers of, for example, $TiO_2$ and $SiO_2$ to realize heat wave shielding by multilayer interferential reflection, the arrangements realized tended to give rise to secondary interferential reflection in the visible light range. This in turn led to a decrease in the transmittance of visible light and the appearance of interference color, with the result that these earlier composite laminations had degraded visible light properties. In was particularly difficult to apply these conventional composite laminates to car window panes because their reduced visible light transmittance and their tendency to produce interference colors impaired both the visibility characteristics of the glass and its appearance. To overcome these problems, various attempts were made to reduce the interferential reflection in the visible light range by subtle adjustment of layer material and thickness, but to little avail.

The present invention makes it possible to almost completely eliminate the interferential reflection produced by a multilayer structure in the visible light range by making the refractive indexes of the two infrared shield layers approximately equal in such range. The composite lamination thus has optical characteristics in the visible light range which are more like those of a single layer than those of a liminated body and because of this is able to provide the colorless transparency in the visible light range that has so long been sought.

The second shielding effect of the present invention results from heat wave absorption, with heat waves of every wavelength being absorbed by at least one of the two infrared shield layers, thus preventing these heat waves from reaching the substrate. For example, the aforesaid ITO and $In_2O_3$ both exhibit heat wave absorption effect. And as this effect is particularly strong in the 10,000–30,000 angstrom spectrum, they are able to absorb heat waves in the wavelength region having longer wavelength than the region of the interferential reflection of the composite lamination. Moreover, since In, Sn and O absorbs shorter wavelength waves than does $In_2O_3$, when the composite lamination is composed of layers of In, Sn and O and $In_2O_3$ in accordance with the embodiments of this invention, absorption occurs over a wide heat wave spectrum so that the shielding effect is considerably enhanced, especially with respect to solar energy.

Although this type of heat wave absorption is inferior to the interferential reflection effect in that it tends to increase the temperature of the composite lamination itself and thus to promote the re-emission of the accumulated heat, it is nevertheless a practical means of enhancing the overall shielding effect since it is capable of blocking the passage of the lower level energy on the long wavelength side of ordinary sunlight. Moreover, in the case where the present invention is applied to car window glass or the like, there is the advantage that the heat wave absorption of the composite lamination helps to prevent fogging or frosting of the window glass. Also advantageously, this effect does not so much heat the entire substrate as heat the surface on which fogging or frosting is apt to occur so that on this point the present invention, wherein the heat absorption takes place in a composite lamination formed as a coating on the surface of a substrate, results in a very considerable improvement in antifogging and antifrosting efficiency. In the case of slight fogging it is totally unnecessary to apply heat to the glass by an electrical means or by blowing hot air thereon, and in the case of heavy fogging or frosting, the heating effect of the absorption can be used in cooperation with an electrical heating element for fog and/or frost prevention to delay fogging or frosting, or to speed up the removal of fog or frost once formed.

The third shielding effect of the present invention results from Drude reflection. This Drude reflection occurs with respect to infrared rays in at least one of the two types of infrared shield layers in a longer wavelength spectrum than that subjected to the aforesaid absorption. Both ITO and $In_2O_3$ exhibit Drude reflection properties. Experiments show that Drude reflection normally occurs at wavelengths above 12,000 angstroms and increases with increasing wavelength. Similarly to the aforesaid case of absorption, the wavelength dependence of Drude reflection is such that ITO begins reflection from a shorter wavelength than $In_2O_3$, and by controlling the nature of the layer material it is possible to have the Drude reflection start from around 10,000 angstroms. Moreover, it has been confirmed that at wavelengths in the range of about 15,000–20,000 angstroms, the rate of Drude reflection exceeds that of heat wave absorption.

This heat wave shielding by Drude reflection can be advantageously utilized in outdoor applications such as for car window glass. This is seen, for example, in the case of a car parked on a road during the summer. By taking advantage of Drude reflection, it will be possible to shut out the secondary radiation from the road surface which is of longer wavelength than the rays of sunlight directly striking the car. In the winter, on the other hand, this same effect will help prevent the escape of radiant heat from within the car. This is because the radiant heat from the car interior is radiated by bodies at between about human body temperature and room temperature and is therefore in the form of very long wavelength infrared rays. Therefore, when the lamination according to this invention is used, this radiant heat will be reflected back into the passenger cabin, thus reducing the load placed on the heater and slowing the rate of temperature drop within the car when the heater is turned off, as when the car is left parked outside.

From the foregoing, it will be clear that the heat wave shielding lamination is capable of providing exceedingly effective heat wave shielding by a combination of the effects of interferential reflection, heat wave absorption and Drude reflection of the composite lamination and further that since the lamination is able to provide this heat wave shielding without loss of transparency in the visible light range, it can be advantageously used in the application described above.

Further, the lamination according to this invention is mechanically stronger and has better electrical conductivity than the conventional coating layer. These are both merits that can be utilized to advantage.

First let us consider mechanical strength. When a conventional coating such as a single layer of ITO is used for shielding against heat waves, in order to utilize heat wave absorption and Drude reflection, it is necessary to make the single layer relatively thick, normally between 2,000–10,000 angstroms and preferably between 3,000–5,000 angstroms or even thicker. When a layer is increased in thickness to such an extent, it suffers a pronounced decrease in strength so that it is liable to break under the effect of heat stress during fabrication or later during use.

In the present invention, on the other hand, the thin coating is made up of a plurality of layers so that it possesses adequate mechanical strength against heat stress and other forces acting thereon. What is more, as it is a multilayer structure, a break arising in any given layer can be confined to a local region and prevented from spreading throughout the coating. In the case of application to a car window pane, it is particularly important for the lamination to possess resistance against the abrasive action of windshield wipers and car washing machines, resistance against warping due to external mechanical forces and thermal expansion, chemical resistance to water, sea water, strong alkaline detergents, acids and organic solvents, and resistance to thermal shocks which may occur when a rain drop or the like hits the glass when it is at a high temperature. The multilayer structure according to this invention is fully able to meet all of these requirements.

The excellent mechanical strength of the lamination according to this invention further makes it possible to utilize the electrical conductivity of the lamination in various ways. ITO is a good electrical conductor while the $In_2O_3$ which constitutes the other material of the lamination is also a conductor, although not such a good one as ITO. Thus, the composite lamination can be used directly as an electrical heating element for the prevention of fogging, whereby the range of application of the substrate is greatly expanded. Moreover, the individual layers are made very thin and, therefore, if they are both made of conducting materials (such as ITO and $In_2O_3$) a local break in the ITO which constitutes the main conducting material is not likely to result in a total electrical discontinuity since the $In_2O_3$ layer adjacent to the portion with the electrical discontinuity will constitute a detour path to the next ITO layer.

Heating of the lamination for antifogging is also advantageous in a number of other ways as it contributes to positive heating of the car interior, suppresses the exchange of interior heat via the heat of condensation at the glass surface, and helps to prevent the escape of heat by reducing the slope of the temperature gradient in the vicinity of the glass surface. Moreover, the heating effect of the lamination is obtained over a wide area so that uniform heating can be attained even without giving much attention to the circulation of air within the car. The contribution of this type of lamination to the heating of the car interior will be especially great in the new types of high fuel efficiency cars such as the ceramic engine car that have been appearing in recent years since in these it is difficult to obtain heat for warming the car interior from the system for cooling the engine.

The conductivity of the lamination can be utilized not only to provide a heating effect but also in a number of other ways. For example, a dew sensor can be formed by using the lamination as an electrode for measuring the electrical resistance at the surface of the glass. It is also possible to employ the lamination as a sensor for determining the temperature of the glass surface.

Again, by combining the electrically conductive lamination with other materials which undergo property changes when exposed to electricity, temperature, light, etc., it is possible to use it as a heating element or an electrode to perform various detecting, light shielding and display operations. As such materials for combination with the lamination there can be mentioned liquid crystal, electrochromic materials, thermochromic materials, photochromic materials, photosensitive materials, any of various temperature indicating paints, $LiTaO_3$ PLZT and other broadly defined electrooptic materials, magnetooptic materials, acoustooptic materials, and other active and passive optical materials, particularly light-emitting devices (LED) and electroluminescent materials.

BRIEF DESCRIPTION OF THE DRAWINGS

FIG. 5 is a cross-sectional view of an important part of a heat wave shielding lamination including an anti-reflection coating according to a third embodiment of the invention.

DESCRIPTION OF THE PREFERRED EMBODIMENTS

The invention will now be described in detail with respect to specific embodiments.

EXAMPLE 1

Figure 2:
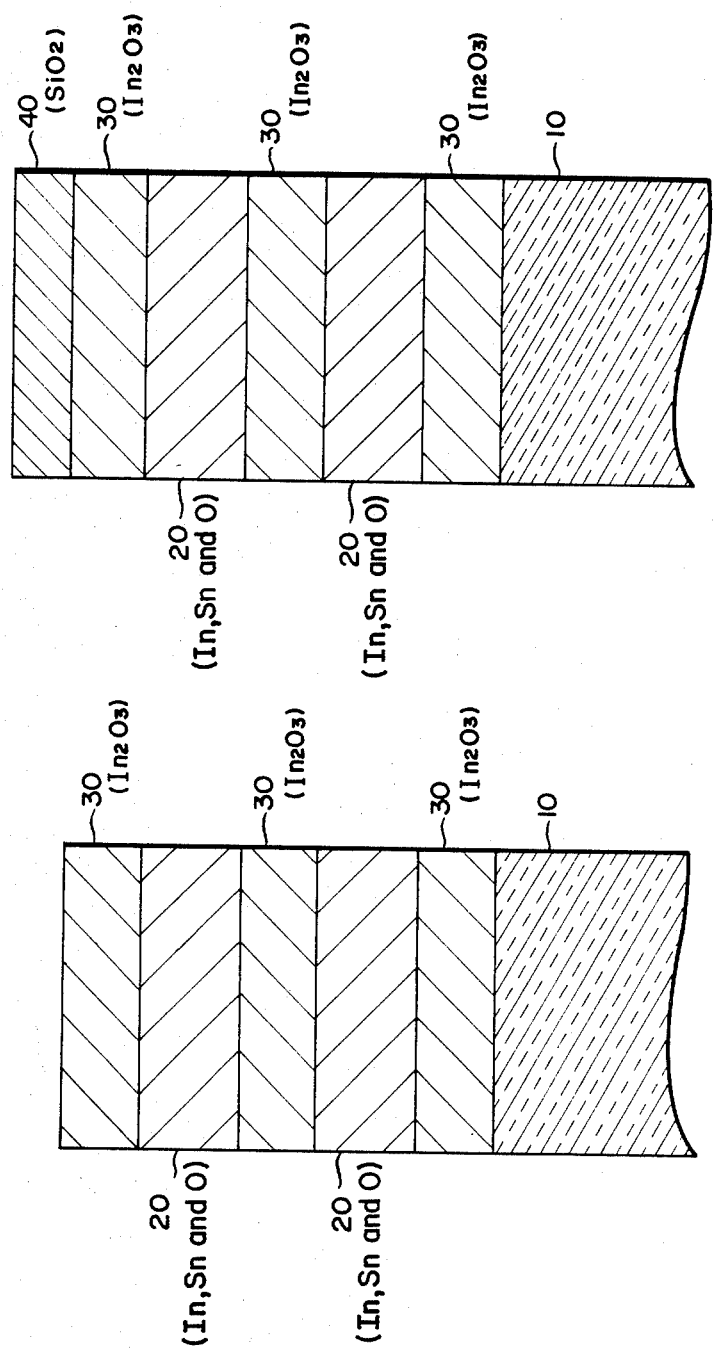
FIG. 2 is a cross-sectional view of an important part of a heat wave shielding lamination according to a first embodiment of the present invention showing a composite lamination formed of ITO and $In_2O_3$ layers.

FIG. 2 shows a first embodiment of the heat wave shielding lamination according to a first embodiment of the present invention. As shown, the lamination consists of two ITO layers 20 as the first type of infrared shield layers and three $In_2O_3$ layers 30 as the second type of infrared shield layers, these layers being provided alternately on the surface of a car window pane 10. The Sn concentration of the ITO layers was 10 atomic %.

In this embodiment the interferential reflection wavelength λ at which heat wave shielding is carried out was set at about 9,500 angstroms so that the thicknesses $d_A$, $d_B$ of the respective layers 20, 30 were determined as follows:

$$d_A = \frac{\lambda}{4n_A} = \frac{9,500}{4 \times 1.4} = 1,700 \text{ angstroms}$$

$$d_B = \frac{\lambda}{4n_B} = \frac{9,500}{4 \times 1.85} = 1,300 \text{ angstroms}$$

Upon actual fabrication it was found that the ITO layers measured 1,700 angstroms and the In$_2$O$_3$ layers measured 1,290 angstroms. The characteristics of the so-fabricated lamination will be described later.

The lamination coating was formed using the DC magnetron sputtering method. For this purpose, the car window pane 10 used as a substrate was heated to 370° C. and the surrounding atmosphere was evacuated to a pressure lower than $4 \times 10^{-4}$ Torr. Argon was then introduced to raise the pressure to $3 \times 10^{-3}$ Torr, at which pressure the sputtering operation was carried out to form the respective layers. In$_2$O$_3$ and In, Sn and O layers were formed alternately on the substrate 10 up to a total of five layers.

Figure 3:
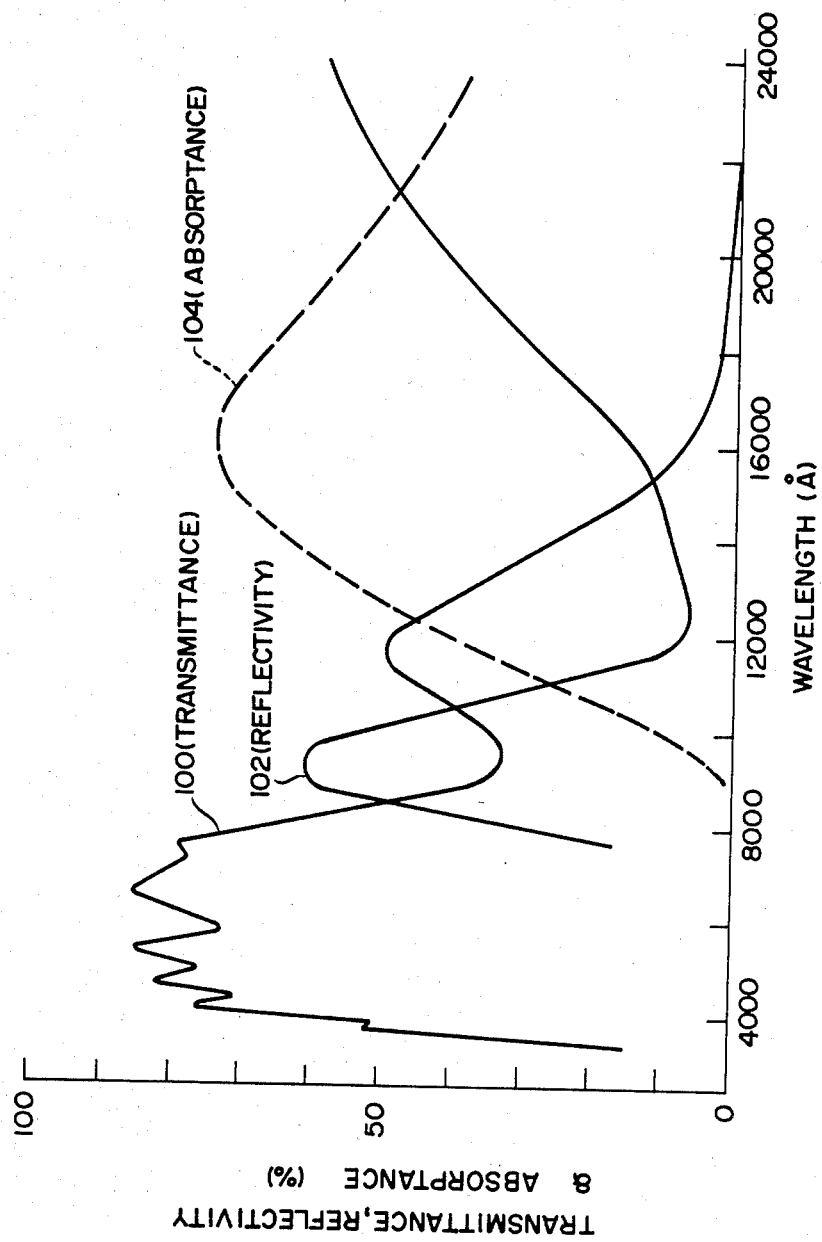
FIG. 3 is graph showing the spectral characteristics of the lamination according to the first embodiment of the invention.

The spectral characteristics of the heat wave shielding lamination according to this first embodiment are shown in FIG. 3, wherein 100 denotes the transmittance, 102 the reflectivity and 104 the absorptance.

First, it will be noted that the transmittance in the visible light range (wavelengths in the range of about 3,700–7,800 angstroms), is excellent (mean transmittance: approximately 80%) more than adequate to meet the minimum 70% requirement for car window glass. Moreover, on the basis of experiments and experience, the lamination had adequate visibility for safe driving. The small irregularities that will be noted in the transmittance curve in the visible light range are the result of the transmittance characteristics corresponding to the interferential reflection of a single layer having a refractive index of 2 and a thickness of about 7,270 angstroms (the combined thickness of the five layers). In actual application, almost no interference coloring could be noted in the pane and the color appeared to be neutral gray or very slightly brown. There was thus no problem on the visibility in applying the pane as the window glass for an automobile.

The first effect employed for heat wave shielding in the present invention, interferential reflection, was observed to be strongly present at the aforesaid set wavelength of about 9,500 angstroms. From this it will be understood that effective heat wave shielding was obtained by interferential reflection in the near-infrared spectrum neighboring the visible light range.

As will be noted from the curve 104 in FIG. 3, heat wave absorption, the second heat wave shielding effect employed by this invention, becomes prominent at wavelengths on the long side of the wavelength spectrum subjected to interferential reflection since there is a rapid rise in absorptance in this region. In the present embodiment, both the In, Sn and O layers and the In$_2$O$_3$ layers contribute to heat wave absorption.

The third heat wave shielding effect used in this invention, namely Drude reflection, gradually increases in strength from a wavelength of around 16,000 angstroms as will be noted from the reflectivity curve 102. From this it will be understood that the heat wave shielding effect of the Drude reflection rises in such a manner as to largely compensate for the decline in the absorptance indicated by the curve 104. Moreover, although not shown in the figure, the reflectivity continues to increase even beyond the wavelength of 24,000 angstroms.

As will be clear from the foregoing, the three heat wave shielding effects, namely the interferential reflection by the multilayer structure, heat wave absorption and Drude reflection, act sequentially from the short wavelength region to the long wavelength region to provide exceedingly good heat wave shielding. Of particular importance is the fact that at wavelengths higher than 16,000 angstroms the transmittance 100 drops to below 10%, thus almost completely shutting out solar heat waves.

It is also worth noting that the optical characteristics shown in FIG. 3 where found to be in good agreement with the optical characteristics calculated through computer analysis on the basis of single layers of ITO and In$_2$O$_3$.

The electrical resistivity of the laminate in accordance with the first embodiment was found to be 6.2 $\Omega$/sq., which works out to $4.5 \times 10^{-4}$ $\Omega$ cm for a uniform single layer with a thickness of 7,270 angstroms. This value is sufficient for use of the laminate as the heating element of a defogger or demister of a car window. Electrodes were provided at an interval of 15 cm on a multilayered coating measuring 15 cm square and 12 V of electric potential was applied across the electrodes. The amount of heat generated was about 0.1 W/cm$^2$ and the surface temperature rose to 40° C. after 60 seconds.

Even when a large current was passed through the heating element to cause a rapid rise in temperature, there was observed absolutely no breaking or peeling of the lamination due to thermal stress. Even when the amount of current was raised to generate heat at about 10 W/cm$^2$, there was still no peeling of the laminated layer, though cracks formed in the glass substrate due to thermal stress.

Thanks to its electrical conductivity, the lamination according to the first embodiment can thus be employed as a planar heating element which, when uniformly heated, can produce an effective antifogging or antifrosting effect on the surface of a car window pane. A planar heating element of this type causes little thermal stress to develop in the glass even under rapid heating so that it has the advantage of being unlikely to cause cracking or other types of damage.

EXAMPLE 2

A second embodiment of the heat wave shielding lamination according to this invention was fabricated in a manner similar to the first embodiment except that each of the two ITO layers constituting the first type of infrared shield layers was formed to a thickness of 1,410 angstroms and each of the three In$_2$O$_3$ layers constituting the second type of infrared shield layers was formed to a thickness of 1,080 angstroms. The spectral characteristics of the so-obtained lamination are shown in FIG. 4, from which it will be noted that in this embodiment interferential reflection begins from a shorter wavelength than in the case of the first embodiment.

Figure 4:
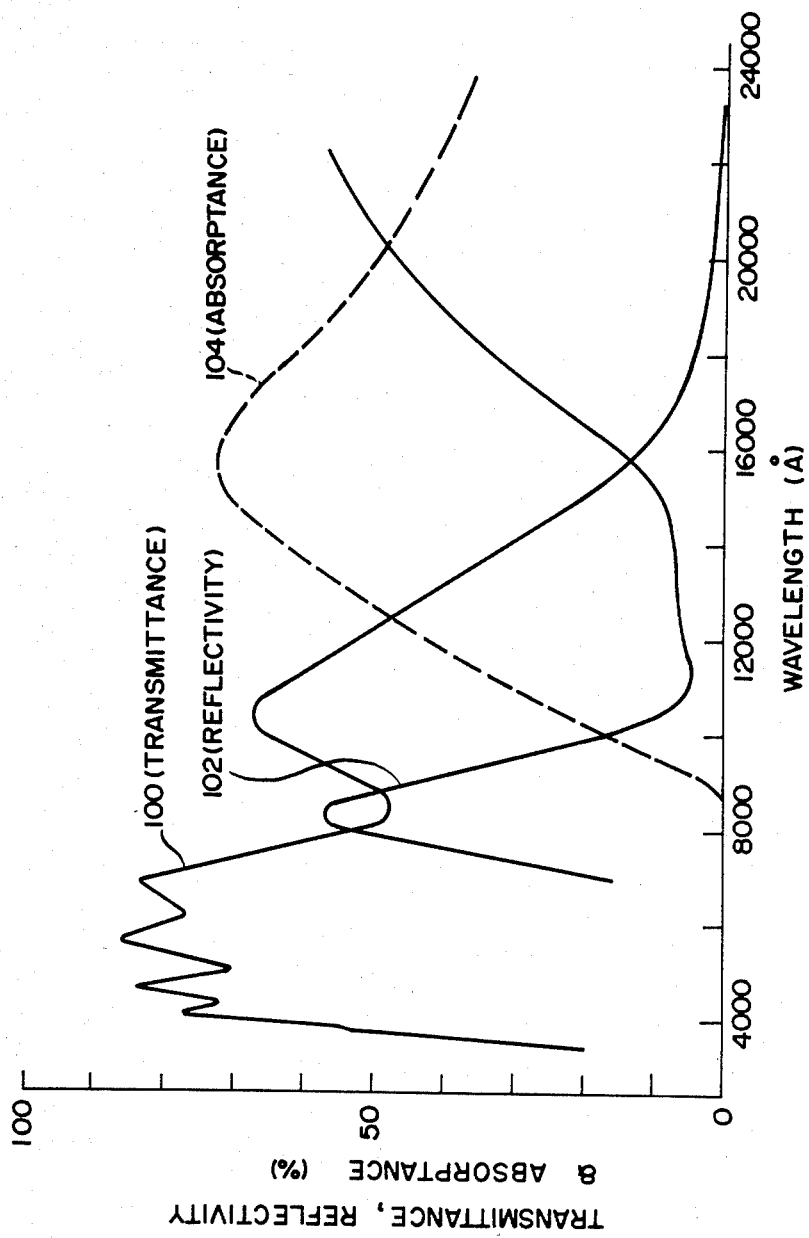
FIG. 4 is a graph showing the spectral characteristics of a lamination according to a second embodiment of the invention.

More specifically, FIG. 4 shows that the heat wave shielding effect by interferential reflection occurs at about 8,500 angstroms, which means that effective heat wave shielding is obtained in the region near the visible light range. On the other hand, however, as the heat wave absorption and Drude reflection characteristics closely resemble those of the first embodiment, there is some drop-off in the heat wave shielding effect in the vicinity of 10,000 angstroms.

Figure 1:
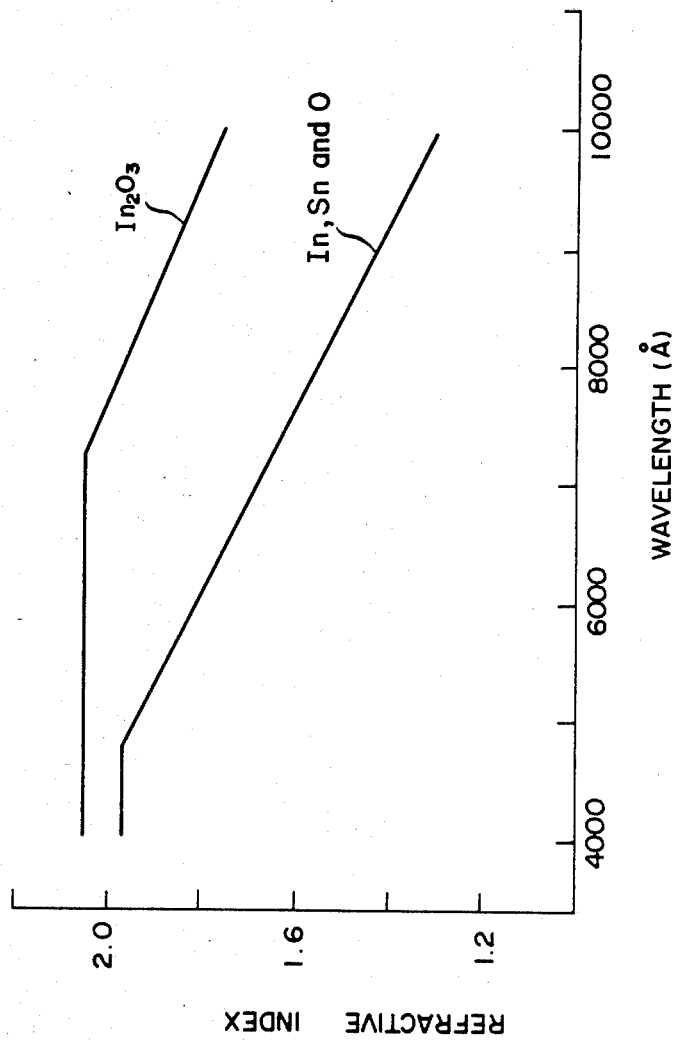
FIG. 1 is a graph showing the spectral characteristics of two types of infrared shield layers used in this invention.

Also, as can be seen from FIG. 1, the refractive indexes of the two types of infrared shield layers are closer together toward shorter wavelengths. Therefore, setting the wavelength for interferential reflection at a shorter wavelength results in weaker reflection. Because of this, in setting the wavelength for interferential reflection it is necessary to take into consideration both the wavelength dependency of the incident light energy and the weavelength dependency of the optical characteristics of the lamination. The laminated layers of the second embodiment were formed by the magnetron sputtering method in an atmosphere of argon at a pressure of $3 \times 10^{-3}$ Torr. The temperature of the substrate was set at 370° C. in spite of the fact that the layer characteristics improve with increasing substrate temperature, because the rate of improvement is low at temperatures exceeding 300° C. and also because it is best to choose a temperature which does not cause the car window pane to lose its temper. In order to improve the strength, electrical compatibility, heat conductivity and other properties at the interfaces between the layers in this second embodiment, the switch-over time between the sputter-formation of consecutive infrared layers of different types was reduced to substantially zero, whereby the introduction of foreign matter at the interfaces was avoided to the greatest degree possible so as to prevent degradation of the interfacial properties. Needless to say, the substrate surface was cleaned by chemical and physical means. Also it was necessary to control the oxygen activity of the sputtering atmosphere in order to control the quality of the layers, and for this purpose activation was carried out as, for example, by adjusting the partial oxygen pressure of the sputtering atmosphere through the introduction of oxygen. It was further found appropriate to subject the completed lamination to heat treatment as required to improve its quality through oxidation or reduction reaction and crystallization.

EXAMPLE 3

In FIG. 5 is shown the structure of a third embodiment of the heat wave shielding lamination according to this invention, wherein an anti-reflection coating 40 is provided on the surface of the composite lamination. This anti-reflection coating 40 consists of $SiO_2$ having a refractive index $n_C$ of approximately 1.43, a value which is approximately equal to the square root of the refractive index (2) of the In, Sn and O and $In_2O_3$ layers in the visible light range. The thickness $d_C$ of the anti-reflection layer is selected as:

$$d_C = \lambda_0/4n_C$$

where $\lambda_0$ is a typical wavelength in the visible light range. In the embodiment the value of $\lambda_0$ is taken as 5,500 angstroms, meaning that the thickness of the $SiO_2$ anti-reflective coating 40 was set at 960 angstroms.

Figure 6:
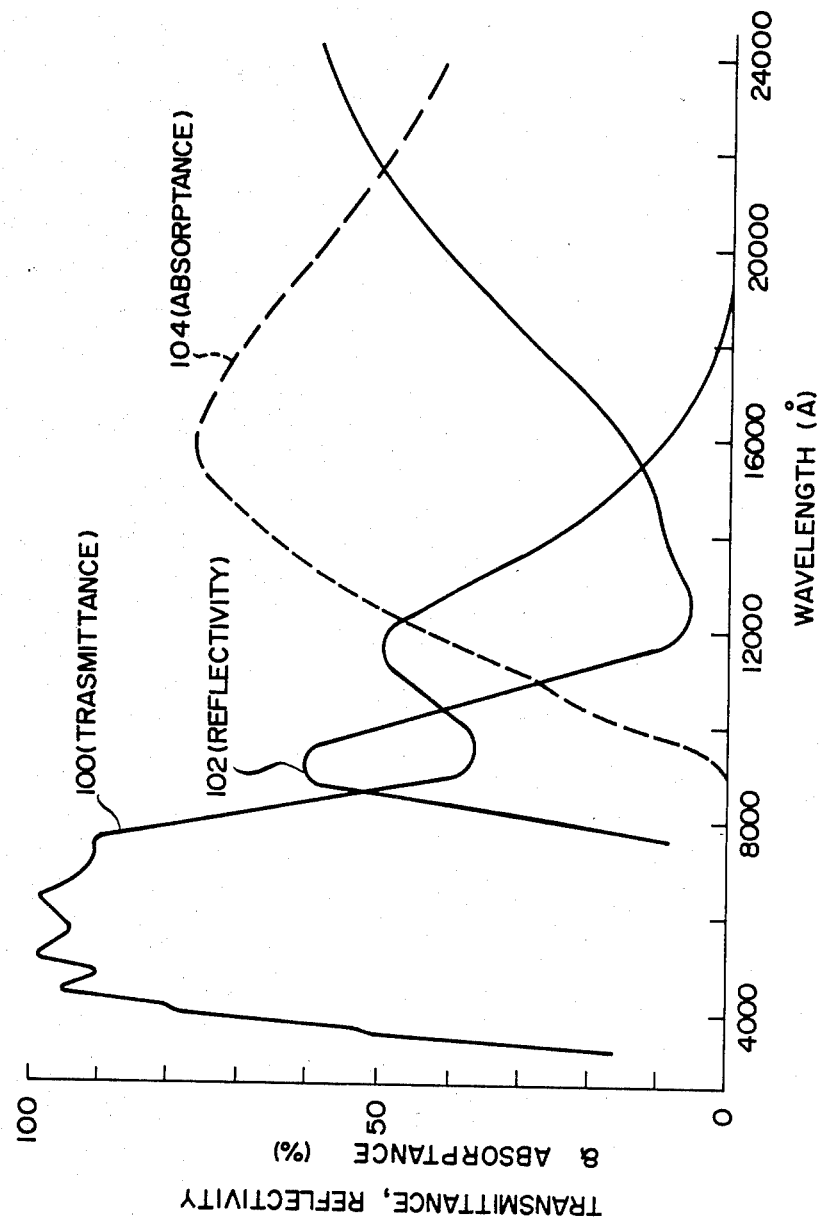
FIG. 6 is a graph showing the spectral characteristics of the lamination according to the third embodiment of the invention.

The spectral characteristics of the heat wave shielding lamination according to this third embodiment are shown in FIG. 6, from which it will be noted that the lamination has heat wave shielding characteristics like those of the first embodiment but that its transmittance to visible light is remarkably better than that of the first embodiment. The main reason for this improvement in transmittance to visible light is that the anti-reflection coating 40 prevents interferential reflection in the visible light range, which is to say that it prevents the interferential reflection of a coating layer which approximates the thickness of the single coating layer constituted by the ITO and $In_2O_3$ layers in combination. In the case of a layer thickness which is about equal to or larger than the wavelength in the visible light range, the effect is the same as that obtained by providing, as the first approximation, an anti-reflection layer (with a refractive index of about $\sqrt{2}$) on a material of infinite thickness having a refractive index of 2.

The $SiO_2$ used for this anti-reflection layer is very strong both mechanically and chemically and is therefore also useful as a protective coating for the lamination. When used in conjunction with a lamination for a car window pane it has the effect of greatly extending the lamination service life. As $SiO_2$ also has a proper degree of affinity for water, it will improve visibility through the car window during rainy weather. Moreover, the electrical insulation property of $SiO_2$ will help to prevent current leakage and also to protect the In, Sn and O and $In_2O_3$ from degradation by electrochemical reaction.

It is also possible to provide the anti-reflection coating between the glass substrate and the bottommost layer 30 of the lamination or, if found necessary, to provide two anti-reflection coatings, one on the surface of the lamination and the other between the lamination and the glass substrate 10.

EXAMPLE 4

Figure 7:
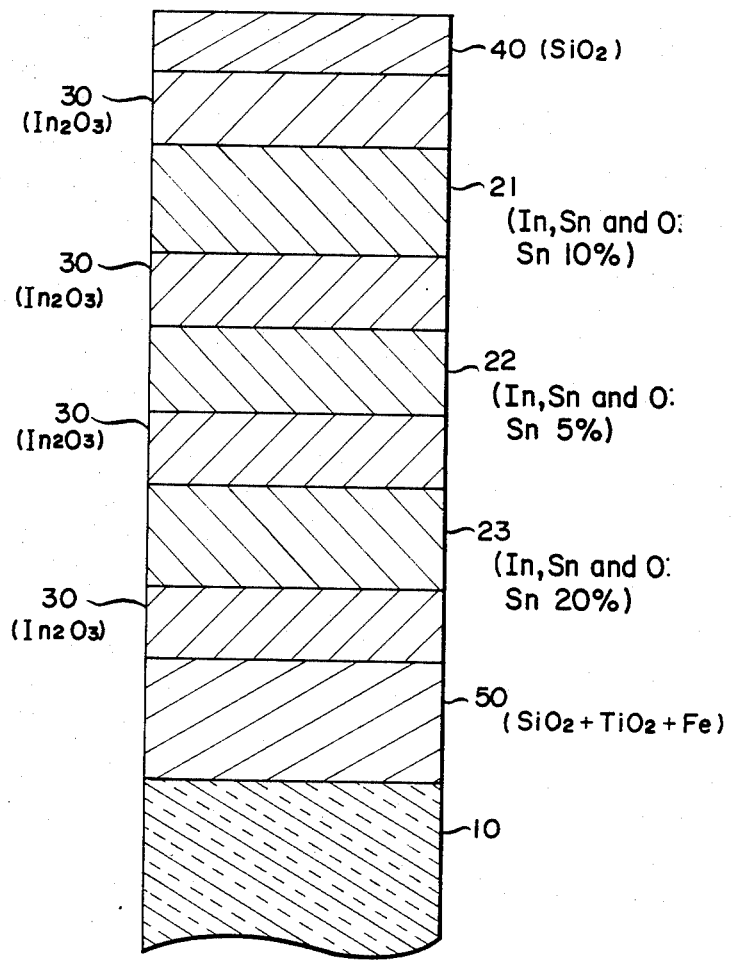
FIG. 7 is a cross-sectional view of an important part of a heat wave shielding lamination according to a fourth embodiment of the invention wherein the layers are formed of ITO with differing amounts of added Sn and the lamination is provided with an anti-reflection layer and an undercoating.

In FIG. 7 is shown a fourth embodiment of the heat wave shielding lamination according to this invention, wherein the lamination consists primarily of ITO and $In_2O_3$ layers but wherein the three In, Sn and O layers contain differing amounts of tin. More specifically, the Sn content is 10 atomic % in the first In, Sn and O layer 21, 5 atomic % in the second ITO layer 22 and 20 atomic % in the third ITO layer 23. By these differing tin contents each of the layers is made to fill its own particular function.

Ordinarily, good results can be obtained using a tin content in the In, Sn and O layers of about 10 atomic %, as was seen from the embodiments described earlier. In the case where all of the In, Sn and O layers have the same tin content, however, there arises the problem that the infrared spectrum over which heat waves can be absorbed becomes narrow. In the present embodiment, however, giving the In, Sn and O layer a tin content of 5 atomic % extends the range of heat wave absorption in the direction of longer wavelengths, while giving the In, Sn and O layer 23 a tin content of 20 atomic % helps to increase infrared ray absorptance. Moreover, the 20 atomic % Sn content of the In, Sn and O layer 23 gives the car window pane a pleasing brown or bronze hue.

Like the third embodiment, the fourth embodiment is also provided with an anti-reflection coating 40 of $SiO_2$ on its outer surface. The provision of this coating improves transmittance in the visible light range and helps to protect the lamination.

The heat wave shielding lamination according to this embodiment is further provided with an undercoating 50 consisting mainly of $SiO_2$ but also containing $TiO_2$, whereby there is realized an adjustment in its refractive index and its coefficient of expansion. If required, the undercoating can also be made to contain a transition element such as iron in order to shut out ultraviolet and infrared rays and to give it a pleasing color. Although the element added to the $SiO_2$ can be provided evenly throughout the undercoating 50, good results can also be attained by providing it with a concentration gradient in the thickness direction as is found appropriate in view of undercoating characteristics.

Through the provision of the undercoating 50 it is possible to completely prevent the invasion into the In, Sn and O and $In_2O_3$ layers of contaminating substances contained in the glass (an alkali, for example) which would degrade the characteristics of these layers, as might happen at the time the lamination is formed on the substrate or later during heat treatment. The provision of the undercoating also helps to improve the optical and thermal stress characteristics of the layer. In particular, in the case where the undercoating has a refractive index in the visible light range which falls between that of the In, Sn and O and $In_2O_3$ layers and that of the glass substrate, its presence helps to mitigate the change in refractive index at the interface between the neighboring In, Sn and O or $In_2O_3$ layer and the glass substrate so that, like the aforesaid $SiO_2$ antireflection layer 40, it serves to diminish reflection in the visible light range. The thickness of the undercoating 50 is appropriately determined in consideration of the aforesaid effects.

EXAMPLE 5

Figure 8:
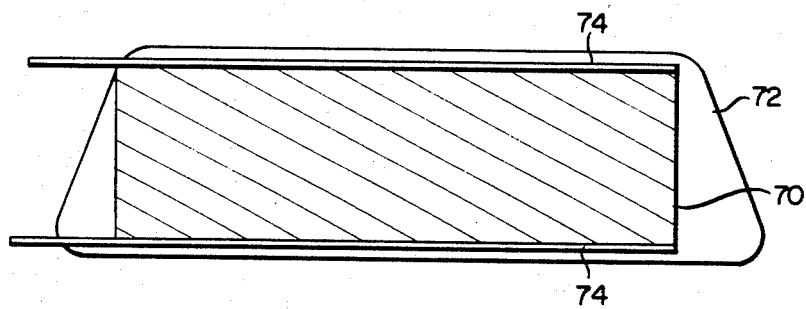
FIG. 8 is an explanatory plan view of a fifth embodiment of the heat wave shielding lamination according to the present invention as applied to the glass substrate of a car window pane.

FIG. 8 shows a heat wave shielding lamination 70 according to this invention provided on the outer surface of a car window 72. The window provided with the heat wave shielding lamination has good transparency over the field of vision ordinarily required for driving and, moreover, provides effective shielding against solar heat waves. The lamination 70 is provided with a pair of electrodes 74 for use as an antenna and as a heating element for the prevention of fogging. As the heating element formed in this way is a transparent planar structure, it is far superior to the conventional wire heating elements in that it does not obstruct the driver's vision and that its heating effect is evenly distributed. Additional advantages are that it acts as a shielding against electromagnetic waves and that it is effective in preventing the accumulation of static electric charge, so that it protects the car occupants and the car's electrical circuitry against electromagnetic noise and sparking. It can also help prevent the adherence of dust.

EXAMPLE 6

Figure 9:
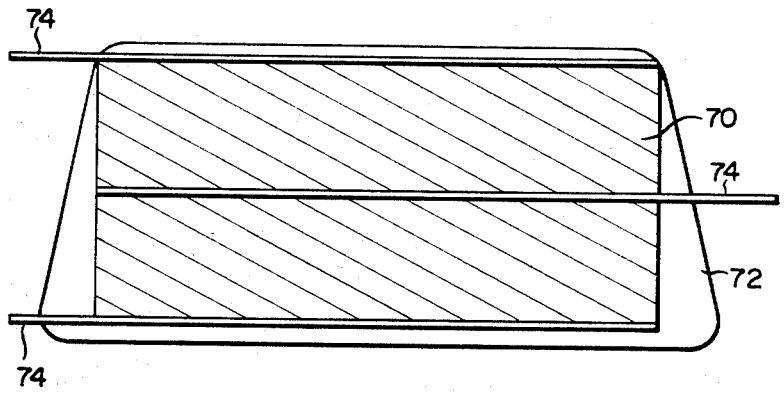
FIG. 9 is an explanatory plan view of a sixth embodiment of the present invention as applied to a car window pane.

FIG. 9 shows a sixth embodiment of the invention realized through a modification of the fifth embodiment. In this embodiment, the number of electrodes 74 is increased so as to make it possible to use a lamination 70 with relatively high resistance as the heating element for the prevention of fogging or frosting. This arrangement also has the advantage of making it possible to pass current between selected electrodes to prevent fogging at specific desired regions of the window.

EXAMPLE 7

Figure 10:
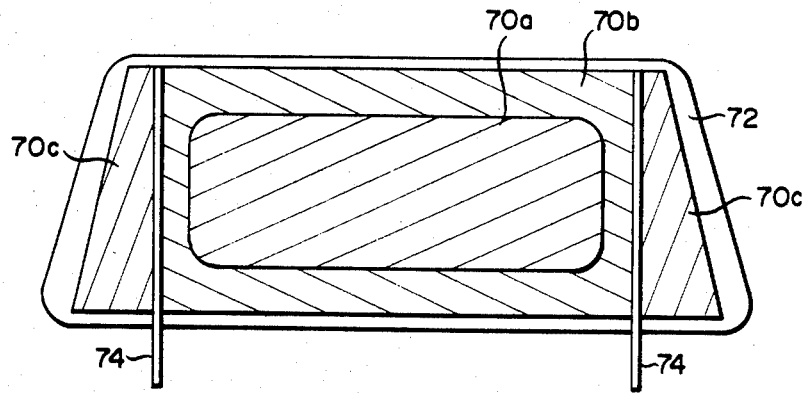
FIG. 10 is an explanatory plan view of a seventh embodiment of the present invention having different characteristics, as applied to a car window pane.

FIG. 10 shows another embodiment wherein the lamination is used as a heating element. More specifically, a car windshield 72 is provided on its surface with three laminations 70a, 70b and 70c each having a different structure from the others (i.e. a different number of layers, layer thickness etc.). With this arrangement it is possible to obtain stronger heat wave shielding and anti-fogging heating effect at specific regions of the windshield. By selection of the layout of the laminations 70 and of their components and structure, it is possible to obtain shielding and/or heating effect only at specific desired regions.

In this embodiment it is moreover possible to obtain a novel effect by employing the structure shown in FIG. 7 wherein the layers of the multilayer structure contain different amounts of tin. More specifically, in this seventh embodiment, the lamination 70a at the center of the windshield 72 requires high electrical conductivity in order to give it higher antifogging capability when it is heated electrically, whereas the lamination 70b requires less conductivity than the lamination 70a, and the lamination 70c is not required to be electrically conductive at all. The electrical conductivity of a lamination can be raised either by increasing the number of its layers or by adjusting the amount of tin added to the In, Sn and O layers (preferably between about 5-10 atomic %). When the laminations 70a, 70b and 70c are given different electrical conductivities in this way, however, the resulting differences in absorptance characteristics in the visible light range will become visible at the boundaries between the different laminations. To overcome this problem, at least one In, Sn and O layer of each of the laminations 70a, 70b and 70c can be made a layer for absorbing visible light (this layer having a brown or bronze hue) and the respective hues of such visible light absorbing layers can be adjusted by adjusting the amount of tin added thereto to make the boundaries unnoticeable.

EXAMPLE 8

Figure 11:
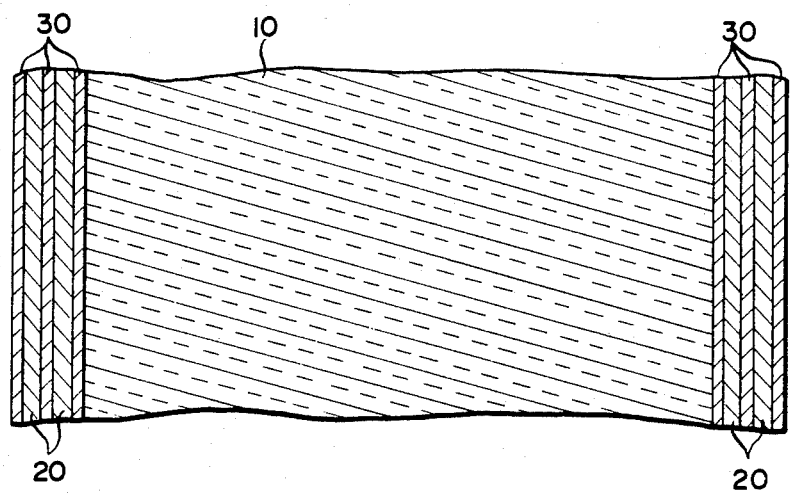
FIG. 11 is a cross-sectional view of an important part of a heat wave shielding lamination according to an eighth embodiment of the invention as applied to a car window pane.

FIG. 11 shows an eighth embodiment of the present invention wherein glass substrate 10 (a car window pane) is provided with laminations on both sides in order to obtain stronger heat wave shielding. Each of the laminations consists of two In, Sn and O layers 20 and three $In_2O_3$ layers 30. Aside from the better heat wave shielding realized, this arrangement makes it possible to selectively heat either or both of the laminations to obtain optimum antifogging effect under all types of weather and driving conditions. Also, the fact that both sides of the glass substrate are heated reduces the danger of breaking due to heat stress, which is advantageous as regards heating at the time of layer formation, of heat treatment following layer formation or of later use.

Moreover, it is advantageous in this eighth embodiment to give at least one of the In, Sn and O layers good electrical conductivity characteristics (by adjusting the amount of added tin to 5-10 atomic %) and giving at least one layer high absorptance of heat waves (by, for example, adjusting the amount of added tin to about 20 atomic %). By a combination of such two types of layers it is possible to attain a further improvement in the absorption of heat waves as well as to provide a layer with good electrical conductivity near the glass 10 where it will be protected from having its electrical conductivity impaired by scratches, cracking etc.

As explained in the foregoing, the present invention makes possible highly effective heat wave shielding by alternately providing two types of infrared shield layers having different properties on top of one another and utilizing in a systematic manner the interferential reflection, heat wave absorption and Drude reflection effects of the resulting heat wave shielding lamination. Moreover, the lamination is characterized by the fact that it not only provides the aforesaid heat wave shielding but also maintains excellent transmittance in the visible light range. Therefore, the present invention provides a highly effective heat wave lamination for use on car window panes or other substrates which are required to be highly transparent. Moreover, the lamination according to this invention has excellent mechanical strength and can be made electrically conductive so that its range of potential application is extremely wide.

We claim:

1. A heat wave shielding lamination comprising a visible light transparent substrate and an overlying composite lamination consisting of at least one first electrically conductive layer formed of indium tin oxide and at least one second electrically conductive layer formed of $In_2O_3$ arranged alternately on top of one another, said first and second layers having approximately the same refractive indexes in the visible light range in order to get good transmittance to visible light but having different refractive indexes in the infrared spectrum against which shielding is desired, said first layer having a thickness of about $\lambda/4n_A$ (where $\lambda$ stands for the wavelength at the center of said infrared spectrum and $n_A$ stands for the refractive index at the wavelength $\lambda$) and said second layer having a thickness of about $\lambda/4n_B$ (where $\lambda$ stands for the wavelength at the center of said infrared spectrum and $n_B$ stands for the refractive index at the wavelength $\lambda$), whereby said first and second layers together exhibit shielding effect against infrared rays in the infrared spectrum by interferential reflection of such rays.

2. A heat wave shielding lamination according to claim 1, wherein the respective first layer and the respective second layer contain different amounts of an additive.

3. A heat wave shielding lamination according to claim 2, wherein the first layer has a higher refractive index than that of the second layer in the infrared layer.

4. A heat wave shielding lamination according to claim 3, wherein the number of the second layers is one greater than the number of the first layers.

5. A heat wave shielding lamination according to claim 4, wherein the amount of tin contained in the first layers differs from layer to layer within the range of 5-20 atomic %.

6. A heat wave shielding lamination according to claim 1, further comprising an anti-reflection layer.

7. A heat wave shielding lamination according to claim 6, wherein the anti-reflection layer is formed of $SiO_2$.

8. A heat wave shielding lamination according to claim 6, wherein said anti-reflection layer is formed on the surface of the composite lamination.

9. A heat wave shielding lamination according to claim 8, further comprising an undercoating between the visible light transparent substrate and the composite lamination thereby protecting the composite lamination.

10. A heat wave shielding lamination according to claim 5, further comprising an anti-reflection layer of SiO on the surface of the composite lamination and an undercoating of $SiO_2$ and $TiO_2$ between the visible light transparent substrate and the composite lamination thereby protecting the composite lamination.

* * * * *